United States Patent [19]

Garman

[11] 4,295,306
[45] Oct. 20, 1981

[54] WINDOW CLIP RETAINER

[75] Inventor: Ronald H. Garman, Pekin, Ill.

[73] Assignee: Caterpillar Tractor Co., Peoria, Ill.

[21] Appl. No.: 89,118

[22] PCT Filed: May 29, 1979

[86] PCT No.: PCT/US79/00365
§ 371 Date: May 29, 1979
§ 102(e) Date: May 29, 1979

[51] Int. Cl.³ .............................. B60J 1/02; B60J 1/08
[52] U.S. Cl. ........................................ 52/208; 52/400; 296/84 R
[58] Field of Search .................................. 52/396-400, 52/208, 403, 202, 573, 401, 773, 774, 775; 296/84 R, 84 A, 84 D; 49/475, 485, 489, 492

[56] References Cited
U.S. PATENT DOCUMENTS

| | | | |
|---|---|---|---|
| 2,280,389 | 4/1942 | Edwards | 52/208 |
| 2,497,261 | 9/1950 | Hicks | 296/84 R |
| 2,765,031 | 10/1956 | Landry | 160/128 |
| 2,856,041 | 9/1958 | Sontheim | 52/208 |
| 3,343,317 | 9/1967 | Cripe | 52/208 |
| 3,503,168 | 3/1970 | Eggert | 52/208 |

Primary Examiner—John E. Murtagh
Attorney, Agent, or Firm—Wegner, Stellman, McCord, Wiles & Wood

[57] ABSTRACT

A window assembly (10,110,210,310,410,510) wherein a frame (16,116,216,316,416,516) carrying a window pane (15,115,215,315,415,515) is resiliently mounted to a wall portion (14,114,214,314,414,514) by a seal (20,120,220,320,420,520). A retainer (21,121,221,321,421,521) is secured to the wall portion and defines a retaining portion (24,124,224,324,424,524) disposed adjacent the frame so as to limit movement of the frame relative to the wall portion. The retainer retaining portion may be juxtaposed to one or more stop shoulders of the frame which may be defined by the side surfaces of a recess (26,126,226,326,426,526). The retainer may be alternatively mounted outwardly or inwardly of the wall portion. The retainer may be removably secured to the wall portion by threaded securing elements (23,123,223,323,423,523).

24 Claims, 7 Drawing Figures

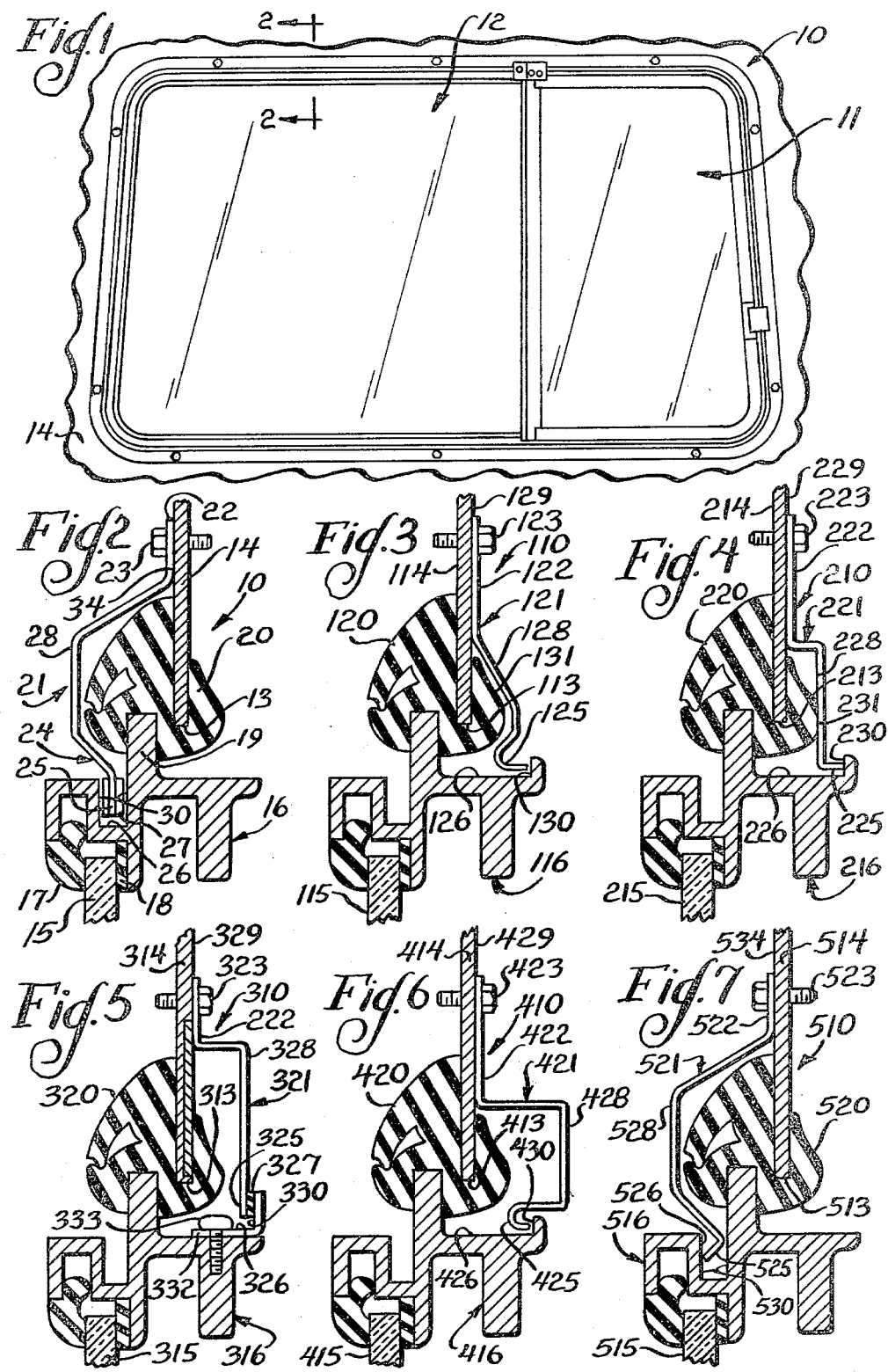

WINDOW CLIP RETAINER

DESCRIPTION

1. Technical Field

This invention relates to window assemblies and in particular to window assemblies for use in vehicles and the like.

2. Background Art

In vehicles, such as tractors and the like, it is desirable to provide windows in the operator's cab which may be subject to substantial vibration and inadvertent forces tending to push the window assembly from the cab opening in which it is mounted.

It has been conventional to mount the window pane in a frame carried by a resilient sealing strip mounted to the wall portion defining the window opening. One example of a window assembly of this type for use in mounting windshields or rear deck windows in automotive vehicles and the like is illustrated in U.S. Pat. No. 3,338,015 of William Hoverman, Jr. As shown therein, a sealing strip mounts the peripheral portion of the window pane to a laterally disposed edge portion of the mounting wall. In one form, an outside trip strip is mounted on the outside of the seal strip by attachment to the window frame. Hoverman, Jr. is concerned with the mounting of the edge of the pane to the frame and does not show or suggest any means for mounting the frame to the wall defining the opening in which the frame is installed.

DISCLOSURE OF INVENTION

The present invention comprehends an improved window assembly having means for stabilizing the resilient mounting of a window frame to the portion of the wall defining the opening in which the frame and pane carried thereby are installed.

More specifically, the invention comprehends the provision of such a window assembly wherein the frame is mounted to the edge of the wall defining the window opening by a resilient member. A retainer is secured to the wall to extend into juxtaposition to the frame for limiting movement between the frame and wall portion.

The frame may be provided with a recess opening toward the wall portion and the retaining means may comprise a portion of the retainer movably received in the recess.

The retaining means may comprise a turned end of the retainer.

In one form, the retaining means is provided with a resilient element to be engaged by the frame for resiliently limiting movement between the frame and wall portion.

In one form, the resilient member mounting the frame to the wall portion engages the retainer to bias the retainer.

In one form, the recess is spaced forwardly of the wall portion and in another form, the recess is aligned with the wall portion and may extend to substantially rearwardly thereof.

In one form, the recess may be defined, in part, by an element secured to the frame. In the illustrated embodiment, the element is removably secured to the frame by threaded securing means.

In broad concept, the invention comprehends providing on the frame a shoulder and a retainer selectively engaging the shoulder to limit movement of the frame relative to the wall portion.

The shoulder may be defined by means secured to the frame.

The retainer may engage the shoulder either directly or through a resilient pad, as desired.

The retainer may be formed to extend freely about the seal and is arranged to permit movement of the frame and pane carried thereby both in the flatwise extent of the pane and perpendicularly thereto.

Thus, the window assembly of the present invention is extremely simple and economical of construction while yet providing a number of meritorious advantages as discussed above.

BRIEF DESCRIPTION OF THE DRAWING

FIG. 1 is a fragmentary side elevation of a window assembly installed in a wall portion of a vehicle or the like;

FIG. 2 is an enlarged vertical section taken substantially along the line 2—2 showing the means for mounting the window pane to the vehicle wall portion in greater detail;

FIG. 3 is a section similar to that of FIG. 2 illustrating another form of mounting means embodying the invention;

FIG. 4 is a section similar to that of FIG. 2 but illustrating still another form of mounting means embodying the invention;

FIG. 5 is a section similar to that of FIG. 2 but illustrating yet another form of mounting means embodying the invention;

FIG. 6 is a section generally similar to that of FIG. 2 but illustrating a further modified form of mounting means embodying the invention; and FIG. 7 is a section generally similar to that of FIG. 2 but illustrating yet another form of mounting means embodying the invention.

BEST MODE FOR CARRYING OUT THE INVENTION

In the exemplary embodiment of the invention as shown in FIGS. 1 and 2 of the drawing, a window assembly generally designated 10 illustratively comprises a sliding window unit having a movable portion 11 and a fixed portion 12. Fixed portion 12 is mounted in an opening 13 in a wall portion 14, such as a wall portion of a vehicle or the like. In the illustrated embodiment, the wall portion defines a portion of the cab of a tractor or other earthworking vehicle wherein substantial vibrations and susceptibility to forces tending to dislodge the window assembly from the opening 13 may occur.

To accommodate such vibrations, the pane 15 of the window assembly may be mounted to a frame generally designated 16 by means of a resilient seal 17 and gasket 18.

As shown in FIG. 2, the frame may further include a peripheral outwardly projecting flange 19 received in a resilient seal 20 which, in turn, is mounted to wall portion 14 so as to resiliently mount the frame 16 and pane 15 carried thereby in the window opening 13.

As discussed above, at times forces may be applied to the window assembly tending to undesirably move it from the position shown in FIG. 2 so as, at times, to cause dislodgement of the window assembly from the wall portion 14. More specifically, the invention comprehends the provision of a retainer generally designated 21 having a mounting portion 22 secured to the wall portion 14 by suitable means, such as screw 23.

The retainer further defines retaining means generally designated 24 juxtaposed to the frame 16 for limiting movement between the frame and wall portion 14.

As shown in FIG. 2, the retaining means may comprise an end portion 25 of the retainer received in a recess 26 in the frame opening toward the wall portion 14. The end portion 25 may be provided on its opposite side with resilient means illustratively comprising rubber pads 27 disposed to engage the shoulder surfaces defined by the opposite sides of the recess 26.

The midportion 28 of the retainer may be formed as by bending to extend around the seal 20 and provide limited flexibility of the retainer in a direction parallel to the flatwise extent of the pane 15, as well as to permit movement of the retaining means 24 perpendicularly to the flatwise extent of the pane 15. However, the retainer is preferably formed of a relatively rigid material, such as sheet metal, so as to effectively limit movement between the frame 16 and wall portion 14, thereby effectively preventing dislodging of the window assembly from the wall portion 14 and maintaining it in place across the opening 13, as shown in FIGS. 1 and 2.

Referring now to the embodiment of FIG. 3, a modified form of window assembly generally designated 110 is shown to comprise a window assembly generally similar to window 10 but wherein the retainer 121 is secured to the inner surface 129 of the wall portion 114 and includes a turned end portion 125 received in a recess 126 opening toward and in alignment with the wall portion 114. The inner side surface 130 of the recess 126 effectively defines a stop shoulder for limiting inward movement of the turned end 125 of retainer 121, thereby effectively limiting outward movement of the pane 115 and frame 116 relative to wall portion 114.

As shown in FIG. 3, the midportion 128 of retainer 121 may be formed similarly to the rear surface 131 of the seal 120 so that the seal resiliently limits the outward movement (or to the left as seen in FIG. 3) of the connecting portion 128 and thereby further limiting the outward movement of pane 115 and frame 116.

Referring now to the embodiment of FIG. 4, a window assembly generally designated 210 is shown to comprise a window assembly generally similar to window assembly 10 but utilizing a retainer generally designated 221 having a connecting portion 228 abutting the rear surface 231 of the seal 220 so as to bias the turned end 225 of the retainer against the shoulder 230 of the frame 216 defining the inside side surface of the recess 226.

Referring now to the embodiment of FIG. 5, still another form of window assembly generally designated 310 is shown to comprise a window assembly generally similar to window assembly 10 but wherein the end 325 of the retainer 321 is provided with a resilient element 327 for engaging the stop surface 330.

Window assembly 310 further differs from window assembly 10 in that the recess 326 defining the stop surface 330 is formed, in part, by a removable element 332 secured to frame 316 by suitable securing means, such as threaded screw 333.

Referring now to the embodiment of FIG. 6, yet another modified form of window assembly generally designated 410 is shown to comprise a window assembly generally similar to window assembly 10 but wherein the turned end 425 of the retainer 421 is U-shaped, opening inwardly toward the stop shoulder 430.

Yet another modified form of window assembly generally designated 510 is illustrated in FIG. 7 wherein the retainer 521 is mounted to the outer surface 534 of the wall portion 514 and is provided with a V-shaped distal end 525 received in the frame recess 526. As shown in FIG. 7, the turned end portion 525 may engage both of the side surfaces of recess 526.

Similar elements of each of the different embodiments are identified by similar reference numerals but 100 different. Except as discussed above, each of the embodiments functions similarly to the embodiment of FIG. 2 in providing an improved means for effectively preventing dislodging of the window assembly from the wall portion opening in which it is resiliently mounted by the seal member.

INDUSTRIAL APPLICABILITY

The window assemblies of the different embodiments discussed above may be utilized in a wide range of industrial applications wherein it is desirable to mount a window pane resiliently in an opening defined by a wall portion while yet effectively preventing dislodging of the window assembly therefrom as by inadvertent forces acting thereagainst.

Thus, the window assembly structures of the present invention are advantageously adapted for use in vehicles and the like wherein vibrations and such undesirable forces may be directed against the window assembly in the use of the vehicle. The window assemblies are particularly advantageously adapted for use in earthworking vehicles and the like wherein substantial vibration forces often occur and forces acting tending to dislodge the window assembly from the mounting wall often occur.

Other aspects, objects and advantages of this invention can be obtained from a study of the drawings, the disclosure and the appended claims. The foregoing disclosure of specific embodiments is illustrative of the broad inventive concepts comprehended by the invention.

I claim:

1. In a window assembly (10,110,210, 310,410,510) having a pane (15,115,215,315,415,515) provided with a peripheral frame (16,116,216,316,416,516), and resilient mounting means (20,120,220,320,420,520) extending about the periphery of the frame for resiliently sealingly mounting the frame to a wall portion (14,114,214,314,414,514) defining an opening (13,113,213,313,413,513) for receiving the window assembly, said resilient mounting means providing the normal sole mounting of the frame to said wall portion, the improvement comprising a motion limiting means comprising:
a substantially rigid retainer (21,121,221,321,421,521) having a mounting portion (22,122,222,322,422,522), and a retaining portion (25,125,225,325,425,525); and
securing means (23,123,223,323,423,523) for fixedly securing said mounting portion to one of said wall portion and said frame, said retaining portion being disposed adjacent the other of said wall portion and frame with a preselected spacing therebetween in the normal position of the frame as supported by said resilient mounting means to prevent dislodging of the window assembly from the wall portion in the event of relative movement between the wall portion and frame permitted by said resilient mounting means reaching a preselected maximum movement as determined by said spacing of said retaining portion.

2. The window assembly of claim 1 wherein said retainer (21,121,221,321,421,521) includes a turned connecting portion (28,128,228,328,428,528) resiliently connecting said retaining portion to said mounting portion.

3. The window assembly of claim 1 wherein said retainer comprises a metal clip and includes a bent connecting portion (28,128,228,328,428,528) resiliently connecting said retaining portion to said mounting portion.

4. The window assembly of claim 1 wherein said retainer extends about said resilient mounting means (120,220,320,420).

5. In a window assembly (10,110,210,310,410,510) having a pane (15,115,215,315,415,515) provided with a peripheral frame (16,116,216,316,416,516), and first, resilient mounting means (20,120,220,320,420,520) extending about the periphery of the frame for resiliently sealingly mounting the frame to a wall portion (14,114,214,314,414,514) defining an opening (13,113,213,313,413,513) for receiving the window assembly, said first mounting means providing the normal sole mounting of the frame to said wall portion, a second motion limiting mounting means comprising:
   a retainer (21,121,221,321,421,521) having a mounting portion (22,122,222,322,422,522) and a lost motion retaining portion (25,125,225,325,425,525); and
   securing means (23,123,223,323,423,523) for fixedly securing said mounting portion to one of said wall portion and said frame, said retaining portion being associated with the other of said wall portion and frame to provide a second mounting of the frame to the wall portion only in the event of relative movement between the wall portion and frame permitted by said resilient mounting means exceeding a preselected movement as a result of the taking up of the lost motion thereof, said frame being provided with a recess (26,126,226,326,426,526) opening toward said wall portion (14,114,214,314,414,514) and said retaining portion comprising a portion of the retainer movably received in said recess.

6. The window assembly of claim 1 wherein said portion of the retainer is yieldably received in said recess.

7. The window assembly of claim 1 wherein said retaining portion comprises a turned end portion of the retainer.

8. The window assembly of claim 1 wherein said retaining portion (25,125,225,325,425,525) is provided with a resilient element to be engaged by the frame for resiliently limiting movement between the frame and wall portion.

9. In a window assembly (10,110,210,310,410,510) having a pane (15, 115,215,315,415,515) provided with a peripheral frame (16,116,216,316,416,516), and first, resilient mounting means (20,120,220,320,420,520) extending about the periphery of the frame for resiliently sealingly mounting the frame to a wall portion (14,114,214,314,414,514) defining an opening (13,113,213,313,413,513) for receiving the window assembly, said first mounting means providing the normal sole mounting of the frame to said wall portion, a second motion limiting mounting means comprising:
   a retainer (21,121,221,321,421,521) having a mounting portion (22,122,222,322,422,522) and a lost motion retaining portion (25,125,225,325,425,525); and
   securing means (23,123,223,323,423,523) for fixedly securing said mounting portion to one of said wall portion and said frame, said retaining portion being associated with the other of said wall portion and frame to provide a second mounting of the frame to the wall portion only in the event of relative movement between the wall portion and frame permitted by said resilient mounting means exceeding a preselected movement as a result of the taking up of the lost motion thereof, said mounting means (120,220) engaging a portion of the retainer to resiliently bias the retaining means.

10. In a window assembly (10,510) having a pane (15,515) provided with a peripheral frame (16,516) defining an outwardly facing surface, and resilient mounting means (20,520) extending about the periphery of the frame for resiliently sealingly mounting the frame to a wall portion (14,514) defining an opening (13,513) for receiving the window assembly, said mounting means providing the normal sole mounting of the frame to said wall portion, the improvement comprising a motion limiting means comprising:
   a substantially rigid retainer (21,521) having a mounting portion (22,522) and a retaining portion (25,525); and
   securing means (23,523) for fixedly securing said mounting portion to said wall portion (14,514) to cause said retaining portion (25,525) to extend about said mounting means (20,520) to outwardly adjacent said frame outwardly facing surface with a preselected spacing therebetween in the normal position of the frame as supported by said resilient mounting means to permit limited resilient movement of the frame outwardly relative to said wall portion in said resilient mounting means while effectively positively preventing dislodging of the window assembly fully outwardly from said wall portion beyond the maximum movement as determined by said spacing of said retaining portion outwardly of said outwardly facing surface.

11. In a window assembly (10,510) having a pane (15,515) provided with a peripheral frame (16,516), and first, resilient mounting means (20,520) extending about the periphery of the frame of resiliently sealingly mounting the frame to a wall portion (14,514) defining an opening (13,513) for receiving the window assembly, said wall portion (14,514) defining an outer surface (34,534), said first mounting means providing the normal sole mounting of the frame to said wall portion, a second, motion limiting mounting means comprising:
   a retainer (21,521) having a mounting portion (22,522) and a lost motion retaining portion (25,525); and
   securing means (23,523) for fixedly securing said mounting portion to said wall portion (14,514) outer surface to cause said retainer (21,521) to extend in parallel with and about said first mounting means (20,520) to have a lost motion connection to said frame (16,516), said frame being provided with a recess (26,526) opening toward said wall portion (14,514) and said retaining portion comprising a portion of the retainer movably received in said recess, said recess (26,526) being aligned with the flatwise extent of said pane (15,515).

12. The window assembly of claim 10 wherein said recess, said recess (26,526) is spaced outwardly of the wall portion opening (13,513).

13. The window assembly of claim 10 wherein said retaining portion (25,525) includes resilient means providing a resilient engagement between said retainer and frame.

14. In a window assembly (10,510) having a pane (15,515) provided with a peripheral frame (16,516), a resilient seal (20,520) extending about the periphery of the frame for resiliently sealingly mounting the frame to a wall portion (14,514) defining an opening (13,513) for receiving the window assembly, said wall portion (14,514) defining an outer surface (34,534), the improvement comprising:
  a retainer (21,521) having a mounting portion (22,522) and retaining means (25,525) juxtaposed to said frame for limiting movement between the frame and wall portion; and
  securing means (23,523) for securing the mounting portion of the retainer to said wall portion (14,514) outer surface to cause said retainer (21,521) to extend outwardly about said seal (20,520) to adjacent said frame (16,516), said frame being provided with a recess (26) opening toward said wall portion (14) and said retaining means comprising a portion of the retainer movably received in said recess, said portion (25) in the recess including resilient pad means (27) for engagement with the frame (16) therein.

15. In a window assembly (10,510) having a pane (15,515) provided with a peripheral frame (16,516), resilient seal (20,520) extending about the periphery of the frame for resiliently sealingly mounting the frame to a wall portion (14,514) defining an opening (13,513) for receiving the window assembly, said wall portion (14,514) defining an outer surface (34,534), the improvement comprising:
  a retainer (21,521) having a mounting portion (22,522) and retaining means (25,525) juxtaposed to said frame for limiting movement between the frame and wall portion; and
  securing means (23,523) for securing the mounting portion of the retainer to said wall portion (14,514) outer surface to cause said retainer (21,521) to extend outwardly about said seal (20,520) to adjacent said frame (16,516), said frame being provided with a recess (526) opening toward said wall portion (514) and said retaining means comprising a portion of the retainer movably received in said recess, said portion (525) in the recess including a bent section (525) yieldingly engaging opposite sides of the recess (526).

16. In a window assembly (110,210,310,410) having a pane (115,215,315,415) provided with a peripheral frame (116,216,316,416), and first, resilient mounting means (120,220,320,420) extending about the periphery of the frame for resiliently sealingly mounting the frame to a wall portion (114,214,314,414) defining an opening (113,213,313,413) for receiving the window assembly, said wall portion (114,214,314,414) defining an inner surface (129,229,329,429), said first mounting means providing the normal sole mounting of the frame to said wall portion, a second, motion limiting means comprising:
  a retainer (121,221,321,421) having a mounting portion (122,222,322,422) and a retaining portion (125,225,325,425);
  securing means (123,223,323,423) for fixedly securing said mounting portion to said wall portion (114,214,314,414) inner surface to cause said retainer (121,221,321,421) to extend inwardly about said resilient mounting means (120,220,320,420) to adjacent said frame (116,216,316,416); and
  means on said frame defining a lost motion connection of said retaining portion to said frame whereby said second mounting means provides a second mounting of the frame to the wall portion only in the event of relative movement between the wall portion and frame permitted by said resilient mounting means exceeding a preselected movement as a result of the taking up of the lost motion thereof, said means on the frame comprising a recess (126,226,326,426) opening toward said wall portion (114,214,314,414) and said retaining means portion being movably received in said recess, said recess (126,226,326,426) being disposed substantially in said wall portion opening (113,213,313,413).

17. In a window assembly (110,210,310,410) having a pane (115,215,315,415) provided with a peripheral frame (116,216,316,416), and first, resilient mounting means (120,220,320,420) extending about the periphery of the frame for resiliently sealingly mounting the frame to a wall portion (114,214,314,414) defining an opening (113,213,313,413) for receiving the window assembly, said wall portion (114,214,314,414) defining an inner surface (129,229,329,429), said first mounting means providing the normal sole mounting of the frame to said wall portion, a second, motion limiting means comprising:
  a retainer (121,221,321,421) having a mounting portion (122,222,322,422) and a retaining portion (125,225,325,425);
  securing means (123,223,323,423) for fixedly securing said mounting portion to said wall portion (114,214,314,414) inner surface to cause said retainer (121,221,321,421) to extend inwardly about said resilient mounting means (120,220,320,420) to adjacent said frame (116,216,316,416); and
  means on said frame defining a lost motion connection of said retaining portion to said frame whereby said second mounting means provides a second mounting of the frame to the wall portion only in the event of relative movement between the wall portion and frame permitted by said resilient mounting means exceeding a preselected movement as a result of the taking up of the lost motion thereof, said means on the frame comprising a recess (126,226,325,426) opening toward said wall portion (114,214,314,414) and said retaining portion being movably received in said recess, said recess (126,226,326,426) being disposed inwardly of the flatwise extent of said pane (115,215,315,415).

18. In a window assembly (110,210,310,410) having a pane (115,215,315,415) provided with a peripheral frame (116,216,316,416), and first, resilient mounting means (120,220,320,420) extending about the periphery of the frame for resiliently sealingly mounting the frame to a wall portion (114,214,314,414) defining an opening (113,213,313,413) for receiving the window assembly, said wall portion (114,214,314,414) defining an inner surface (129,229,329,429), said first mounting means providing the normal sole mounting of the frame to said wall portion, a second, motion limiting means comprising:
  a retainer (121,221,321,421) having a mounting portion (122,222,322,422) and a retaining portion (125,225,325,425);